(12) United States Patent
Turek et al.

(10) Patent No.: US 12,092,170 B2
(45) Date of Patent: Sep. 17, 2024

(54) COMPLIANT JOINT DRIVE ASSEMBLY

(71) Applicant: Goodrich Corporation, Charlotte, NC (US)

(72) Inventors: Lukasz Turek, Wrocław (PL); Dariusz Sapija, Kiełczówek (PL)

(73) Assignee: GOODRICH CORPORATION, Charlotte, NC (US)

( * ) Notice: Subject to any disclaimer, the term of this patent is extended or adjusted under 35 U.S.C. 154(b) by 182 days.

(21) Appl. No.: 17/831,940

(22) Filed: Jun. 3, 2022

(65) Prior Publication Data

US 2022/0412409 A1    Dec. 29, 2022

(30) Foreign Application Priority Data

Jun. 28, 2021    (EP) ..................................... 21461559

(51) Int. Cl.
| | |
|---|---|
| F16D 3/56 | (2006.01) |
| F16D 3/62 | (2006.01) |
| F16K 5/06 | (2006.01) |
| F16K 31/04 | (2006.01) |

(52) U.S. Cl.
CPC ................ F16D 3/56 (2013.01); F16D 3/62 (2013.01); F16K 5/0647 (2013.01); F16K 31/041 (2013.01)

(58) Field of Classification Search
CPC ..... F16D 3/56; F16D 3/62; F16D 3/58; F16D 3/725; F16D 3/54; F16K 5/0647; F16K 31/041; H02K 7/003
USPC ................ 464/81–83; 251/292–293
See application file for complete search history.

(56) References Cited

U.S. PATENT DOCUMENTS

| | | | | |
|---|---|---|---|---|
| 3,196,635 | A * | 7/1965 | Schmitter | ................ F16D 3/56 464/7 |
| 3,304,743 | A | 2/1967 | Paulsen | |
| 4,286,442 | A * | 9/1981 | Peterson | ................... F16D 3/04 464/83 |
| 4,357,137 | A * | 11/1982 | Brown | .................... F16D 1/101 464/159 |
| 4,413,980 | A * | 11/1983 | Walloch | .................... F16D 3/56 464/83 |
| 4,487,591 | A | 12/1984 | Berg | |

(Continued)

FOREIGN PATENT DOCUMENTS

| | | |
|---|---|---|
| CN | 202768663 U | 3/2013 |
| CN | 203009627 U | 6/2013 |

(Continued)

OTHER PUBLICATIONS

Abstract for CN202768663 (U), Published: Mar. 6, 2013, 1 page.

(Continued)

*Primary Examiner* — John Bastianelli
(74) *Attorney, Agent, or Firm* — CANTOR COLBURN LLP

(57) ABSTRACT

A dielectric insulating assembly arranged to be positioned between a drive shaft and a driven shaft of a motorised drive assembly. The assembly includes dielectric insulation between the drive shaft and the driven shaft and plurality of electrically non-conductive fastener elements configured to connect the drive shaft to the driven shaft and the dielectric insulation therebetween, in torque transfer engagement, the fasteners located around an outer boundary of the dielectric insulation.

12 Claims, 4 Drawing Sheets

(56) References Cited

U.S. PATENT DOCUMENTS

| | | | | |
|---|---|---|---|---|
| 4,618,049 A | * | 10/1986 | Pflaum | F16D 69/027 |
| | | | | 192/53.34 |
| 4,881,980 A | * | 11/1989 | Dietz | C09B 67/0017 |
| | | | | 546/49 |
| 4,917,653 A | | 4/1990 | Collucci | |
| 5,810,237 A | | 9/1998 | Eskola et al. | |
| 6,283,868 B1 | * | 9/2001 | Clarke | F16D 3/74 |
| | | | | 156/137 |
| 8,172,198 B2 | | 5/2012 | Dorsey et al. | |

FOREIGN PATENT DOCUMENTS

| | | |
|---|---|---|
| DE | 175387 C | 6/1906 |
| DE | 2630506 A1 | 1/1978 |
| WO | 2014185778 A1 | 11/2014 |
| WO | 2019216762 A1 | 11/2019 |

OTHER PUBLICATIONS

Abstract for CN203009627 (U); Published: Jun. 19, 2013, 2 pages.
European Search Report for Application No. 21461559.3, mailed Dec. 23, 2021, 17 pages.

* cited by examiner

COMPLIANT JOINT DRIVE ASSEMBLY

CROSS REFERENCE TO RELATED APPLICATIONS

This application claims priority to European Patent Application No. 21461559.3 filed Jun. 28, 2021, the entire contents of which is incorporated herein by reference.

TECHNICAL FIELD

The present disclosure relates to a compliant joint drive assembly whereby torque is transmitted from one end of the assembly to the other, the two ends joined by a compliant joint. An example of such an assembly is a ball valve assembly and, in particular, an assembly for a motorised ball valve.

BACKGROUND

Drive assemblies are used in many applications where a driving force is provided by an actuator such as a manual lever or a motor and the torque from the actuator is transmitted to a movable part along a drive line. For example, a valve may include a valve closure that is rotated by an actuator, either manually by means of a lever or handle or by means of a motor. The drive force from the motor is transmitted to the valve closure along a shaft arrangement, the shaft configured to transfer torque from the actuator to the valve closure. Particularly where the actuator is an electric motor, there is often a need to provide dielectric separation between the electrics and the moveable part especially if the movable part is in e.g. a wet environment, to avoid damage to the 'dry' motor end. On the other hand, it is necessary to maintain torque transmission along the entire drive line.

Ball valves are valves for controlling flow of a fluid e.g. water. The valve includes a ball shaft having a hole therethrough. The ball shaft is rotatable relative to the fluid flow channel such that when the hole is aligned with the channel, the valve allows fluid flow. To stop flow, the ball shaft is rotated so that the hole is not aligned with the flow. Ball valves can be operated manually e.g. by means of a handle for rotating the ball. Actuated ball valves are operated by a motor which moves the ball shaft between the open and closed positions. Ball valves find use in e.g. sanitation or water systems. One application of a valve moved by an electric motor is in an aircraft water supply system. Aircraft commonly have a water supply system for providing potable water to various outlets e.g. to sinks or wash basins, coffee machines, toilets, etc. One or more valve assemblies is provided in the system for the various outlets and at least some of these are driven by an electric motor so that they can be operated remotely or automatically. Such a system is described e.g. in U.S. Pat. No. 8,172,198. The use of actuated ball valves is, however, not limited to aircraft water systems and there are many other fields of application for such systems.

Actuated ball valves comprise the motor and drive part, also known as the 'dry' part, and the ball shaft part, which comes into contact with the water, also known as the 'wet' part. Seals need to be provided between the wet part and the dry part to avoid damage to the assembly by water getting to the electric motor.

In aircraft systems and in other water systems, the valve ball shaft often has to be made of metal to satisfy durability and safety standards. Problems may occur with the valve if a fault in the electric motor transmits to the ball shaft due to the conductive path between the various metal parts.

The inventors have identified a need for a dielectric barrier to be provided between the two ends of a drive train e.g. between the ball shaft and the electric drive part of a ball valve assembly. The design should be capable of transmitting torque from the actuator end of the drive to the moveable part even in the event that the moveable part experiences some resistance e.g. becomes jammed or frozen such that a short torque peak is experienced.

SUMMARY

According to the disclosure, there is provided a dielectric insulating assembly arranged to be positioned between a drive shaft and a driven shaft of a motorised drive assembly, the assembly comprising dielectric insulation between the drive shaft and the driven shaft and plurality of electrically non-conductive fastener elements configured to connect the drive shaft to the driven shaft and the dielectric insulation therebetween, in torque transfer engagement, the fasteners located around an outer boundary of the dielectric insulation.

The assembly may be incorporated into a ball shaft assembly comprising a ball shaft, as a driven shaft.

A motor may be arranged to drive the ball shaft via a cam shaft, as a drive shaft, the assembly located between and in torque transfer engagement with the ball shaft and the cam shaft.

A water system incorporating the assembly is also disclosed.

Preferred embodiments will now be described by way of example only, with reference to the drawings.

DETAILED DESCRIPTION

Figure 1:
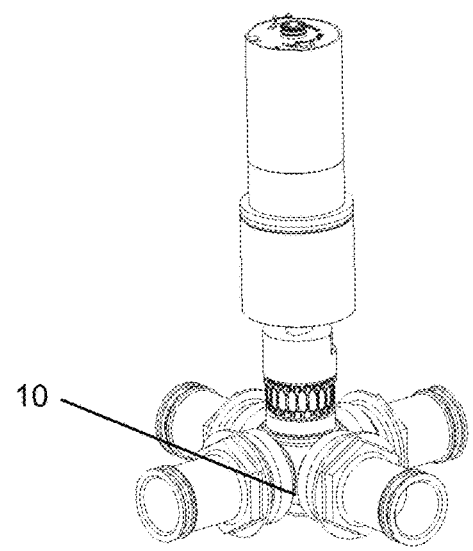
FIG. 1 is a perspective view of a motor driven ball valve assembly that can comprise a dielectric assembly according to this disclosure.

FIG. 1 is a perspective view of a motorised ball valve assembly including a dielectric insulation component according to the present disclosure.

The operational part of the valve comprises a ball shaft 10 having a head part 11*a* defining a hole 12 therethrough defining a flow passage, and a shaft part 11*b* extending from the head for engagement with a drive part of the assembly. In use, the valve is arranged in a water or fluid pipe system such that in a first rotational position of the ball shaft 10, the hole is aligned with a fluid pipe to form a flow passage from the pipe and through the hole 12. To switch off the flow, the ball shaft is rotated e.g. by one quarter turn, so that the hole is no longer aligned with the pipe and, instead, flow from the pipe is blocked by the body 13 of the ball shaft. Valves with several positions and several input/output ports are known. The example shown has four ports.

Figure 2:
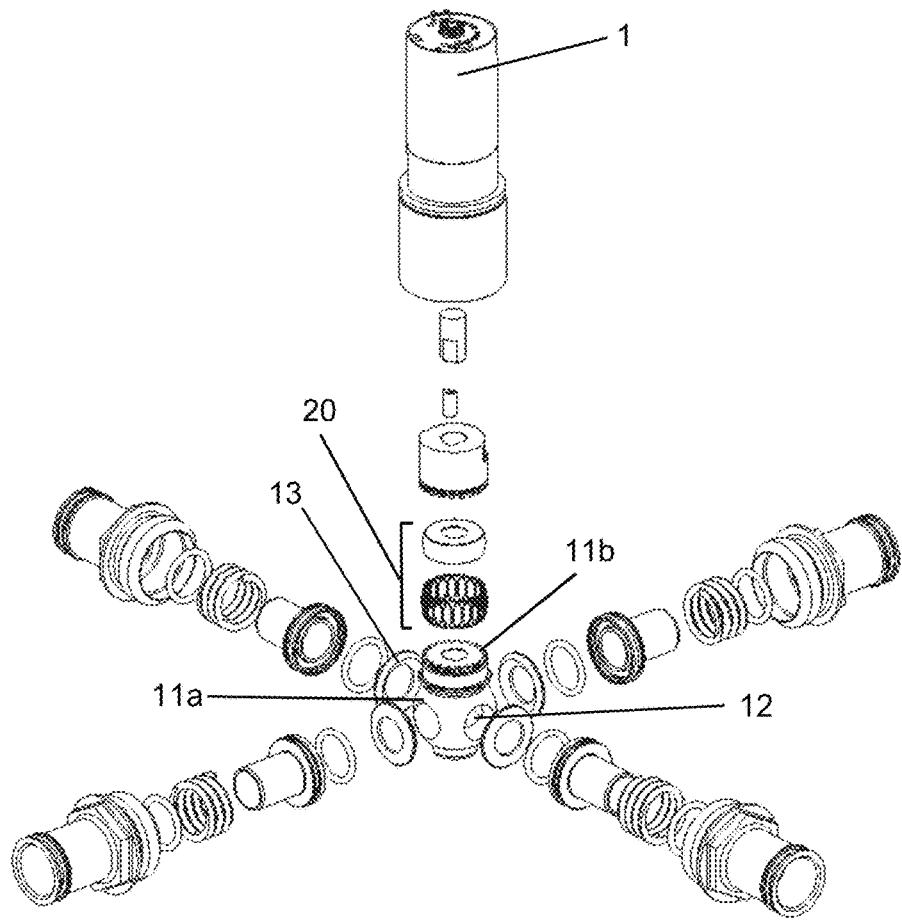
FIG. 2 is an exploded view of the assembly of FIG. 1 according to the disclosure.
Figure 3:
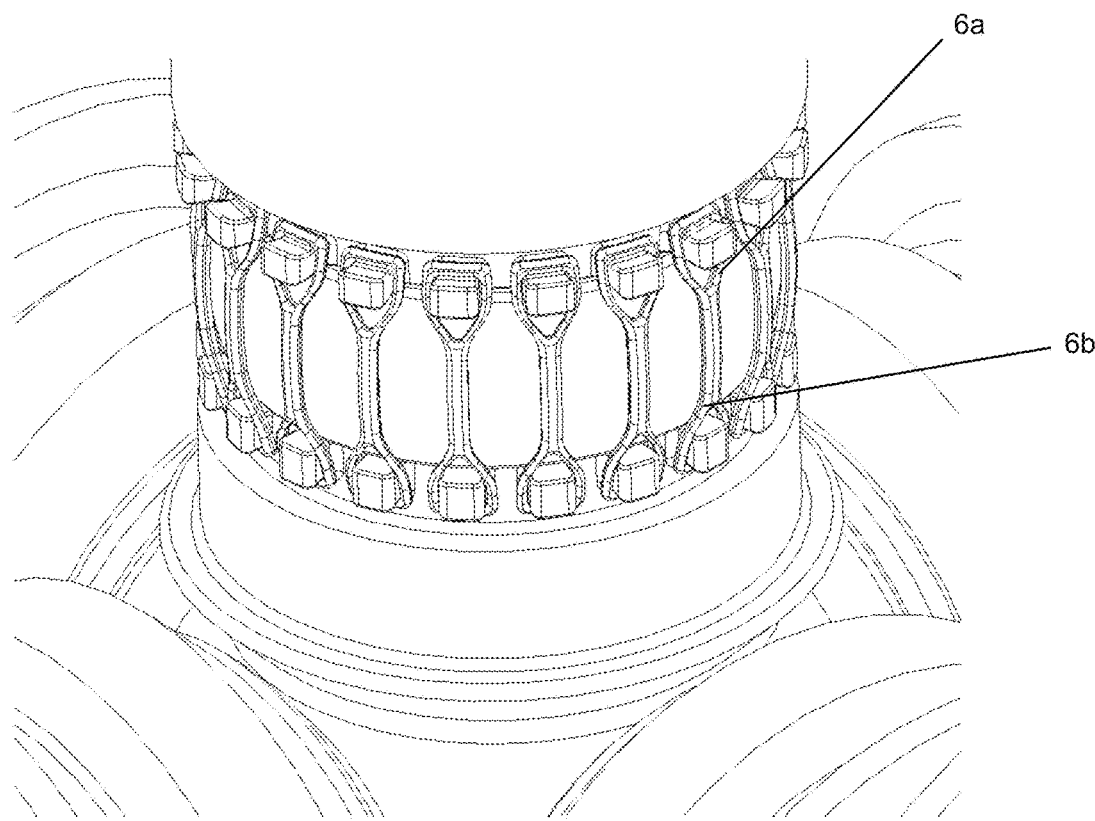
FIG. 3 is a perspective view of one example of a dielectric insulator assembly in accordance with the disclosure.

In a motorised ball valve, the ball shaft is rotated by means of an electric motor 1. The electric motor 1 drives a cam shaft 4 which engages with the ball shaft 10. In the example shown (see FIG. 2) the cam shaft 4 is provided with a key feature 3 that engages with a D-shaft 2—i.e. a D-shaped shaft component extending from the motor. Rotation of the motor 1 causes rotation of the D-shaft 2 which, in turn, rotates the cam shaft 4 which rotates the ball shaft 10. Seals e.g. O-rings (not shown) are provided around the ball shaft 10 to prevent water passing into the electric part of the assembly. The cam shaft may be provided with indicators such as microswitches (not shown) which can be mounted in recesses or races on the cam shaft 4, or other forms of sensors or indicators, to provide an indication of the angular position of the shaft. These components are standard for a motorised ball valve such as described in U.S. Pat. No. 8,172,198.

In the event that the motor fails, there is not only the risk of an electrical fault being transmitted to the wet end of the assembly, but there is also the problem that a motor failure will mean that the ball shaft cannot be rotated. In the event of failure of the motor, it may be necessary to change the position of the ball shaft to switch flow on or off. To address this, a manual handle (not shown) may be provided in close fitting arrangement around the ball shaft so that manual operation of the handle can rotate the ball shaft 10. The handle can be fitted to the ball shaft such that there is a form fitting or frictional engagement between them. Alternatively, a fixing element e.g. a locking pin (not shown) may be provided to secure the handle to the shaft.

As mentioned above, to provide the required strength and to satisfy other standards such as safety, life and hygiene standards, the various shafts and the key feature will often be made of metal e.g. steel. If there is a problem with the electrics at the motor end of the assembly, these would be transmitted directly to the ball shaft and can cause problems such as electric shocks or arcing. To avoid this problem, the assembly of the present disclosure includes a dielectric insulator assembly 20 to be fitted between the ball shaft 10 (or, more generally, driven end) and the electric motor 1 (or, more generally, drive end).

The dielectric insulation assembly is structured to have dielectric properties and is designed and configured to provide torque transmission from the electric motor 1 to the ball shaft 10. The assembly should be such as to be able to withstand a short torque peak if the ball shaft end is fixed or blocked.

The dielectric assembly according to the disclosure forms a dielectric barrier between the drive and the driven ends of the system using fastening elements for securing the drive end to the driven end but spaced by a dielectric insulating area as described in more detail below. In an example, particularly for use in wet or harsh environments, all of the components required for torque transfer are made of steel, particularly stainless steel expect for the dielectric assembly parts which function as a dielectric barrier between the steel parts.

The dielectric assembly of the present disclosure is a combination of a dielectric insulator and fastening elements to secure the drive end and the driven end to each other but spaced apart where the dielectric insulator is located. In one example, described further below, the dielectric insulator may be provided as an air gap between the drive and the driven end and the fasteners are structured to maintain the air gap. In a preferred example, though, the dielectric insulator is in the form of a disk of dielectric material and the fasteners secure the disk in place between the drive end and the driven end. The combination of the dielectric and the fasteners acts to transfer torque from the drive end to the driven end. The assembly of the disclosure will be described now in more detail with reference to the example of a ball valve. As mentioned above, however, the assembly may find application in other torque transmission systems where insulation is desired.

In the example shown, the dielectric assembly is located between the cam shaft 4 and the ball shaft 10 and includes a disk 5 of dielectric material sized and shaped to be located between the two shafts. The type of material and its thickness can be selected according to the nature of the application and the likely currents. The disk 5 is preferably a simple disk having opposing flat major surfaces that respectively abut the opposing ends of the cam shaft and the ball shaft and a peripheral wall. The disk preferably has a cross-section matching that of the shafts—usually circular or oval—and the peripheral wall between the major surfaces may be straight or convex.

Figure 4:
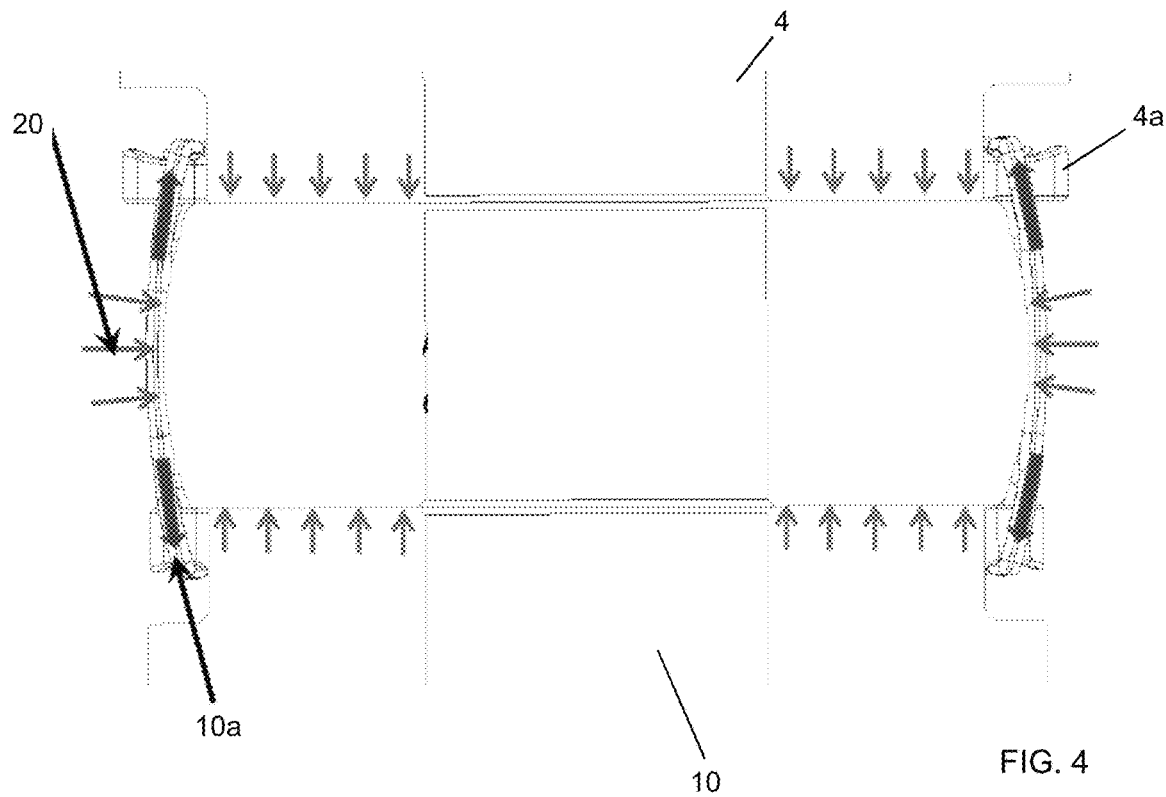
FIG. 4 shows a cross-section of the disk of the assembly of FIG. 3.

The dielectric insulation assembly provides electrical insulation between the dry and wet parts of the motorised ball valve assembly whilst ensuring torque transfer between the shafts of the respective parts. The disk must therefore have dielectric properties. Various dielectric materials are known and can be used, for example, but not exclusively, plastic, e.g. PEEK, G10, FR4, G11, FR5 etc., rubber (EPDM), ceramic or aluminium with an oxidized layer on the entire outer surface as a dielectric barrier. The material selected should have superior strength in terms of compression rather than in the tension or shear directions, as the torque is transferred in the compression direction as shown in FIG. 4. Plastic and rubber materials allow the sleeve to buffer vibration or shocks sent by the motor through the system.

Because the disk is a simple disk with no engagement features such as teeth or grooves to engage with the shafts, in the assembly of the disclosure, fastening elements 6 are provided extending from the cam shaft to the ball shaft across the depth of the dielectric disk as defined by the peripheral wall. These fasteners are arranged to hold the cam shaft, the ball shaft and the dielectric disk all in close fitting assembly such that torque is transmitted through the disk from the cam shaft to the ball shaft—i.e. so that the cam shaft cannot rotate relative to the disk and/or the ball shaft—all three parts will rotate together due to the tight frictional engagement created by the tension of the fastening members 6.

The fastening members 6 are pre-loaded to ensure the necessary tension. These may be made of aramid fibers or the like, which can be additively manufactured. The fastener members must be electrically non-conductive to ensure the insulation between the cam shaft and the ball shaft and may also have dielectric properties.

In the example shown, the fasteners are in the form of ties having looped ends 6*a*, 6*b*. The cam shaft 4 and the ball shaft 10 are provided with projections or pins 4*a*, 10*a* around their ends to which the loops of the fasteners can be attached such that each fastener extends from a first end loop engaging with a pin of the cam shaft to a second end loop engaging with an opposite pin of the ball shaft, the tie being stretched across the peripheral wall of the disk 5. A number of such fasteners will be provided around the circumference of the shafts and the disk as shown. Other means for attaching the fastening members to the cam shaft and the ball shaft are also possible and therefore other types of fastener may also be used provided the fasteners secure the shafts and the intermediate dielectric disk together in torque transmitting engagement and retain the disk between the cam shaft and the ball shaft.

To position the fasteners, in the example shown, one end of each fastener is attached to one of the cam shaft and the ball shaft and the fastener is then stretched over the disk wall and is secured to the other of the ball shaft and the cam shaft. Because the fasteners are stretched as they are attached, this introduces the desired tension loading against the disk wall. The amount of stretching determines the pre-load in the system. This loading is improved if the peripheral wall of the disk is convex. This ensures that the disk wall is in contact with all fasteners which, in turn, ensures that the disk remains coaxial with respect to the cam shaft and the ball shaft even during standard operation. The tension loading can be seen with reference to FIG. 4. The fasteners ensure a compressive loading 15 on the disk to hold it in place and a compressive side loading 16 to maintain coaxiality. Coaxiality can be verified by a bore 17 through the axes of the shafts and the disk.

In the example where the dielectric insulation is provided by a disk, the disk should be sized and shaped and held tightly by the fasteners such that there is no air gap between the shafts and the disk and also no direct contact between any metal parts across the joint.

Figure 5A:
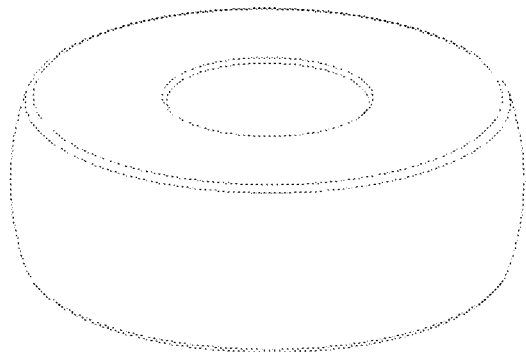
FIGS. 5A and 5B show examples of a dielectric disk for use in an assembly according to the disclosure.
Figure 5B:
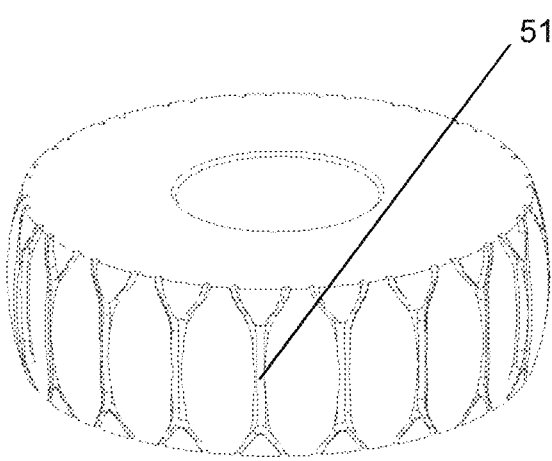

The surfaces of the dielectric disk may be smooth as shown in FIG. 5A. Alternatively, grooves or indents 51 may be formed on the outer surface of the disk to provide additional retention for the fasteners 6. Whilst the smooth design of FIG. 5A relies purely on frictional grip due to the tensioning of the fasteners, the grooved example of FIG. 5B provides additional resistance from the fasteners. On the other hand, the cost of manufacture of a grooved disk is greater than for the simple, smooth disk.

Figure 6A:
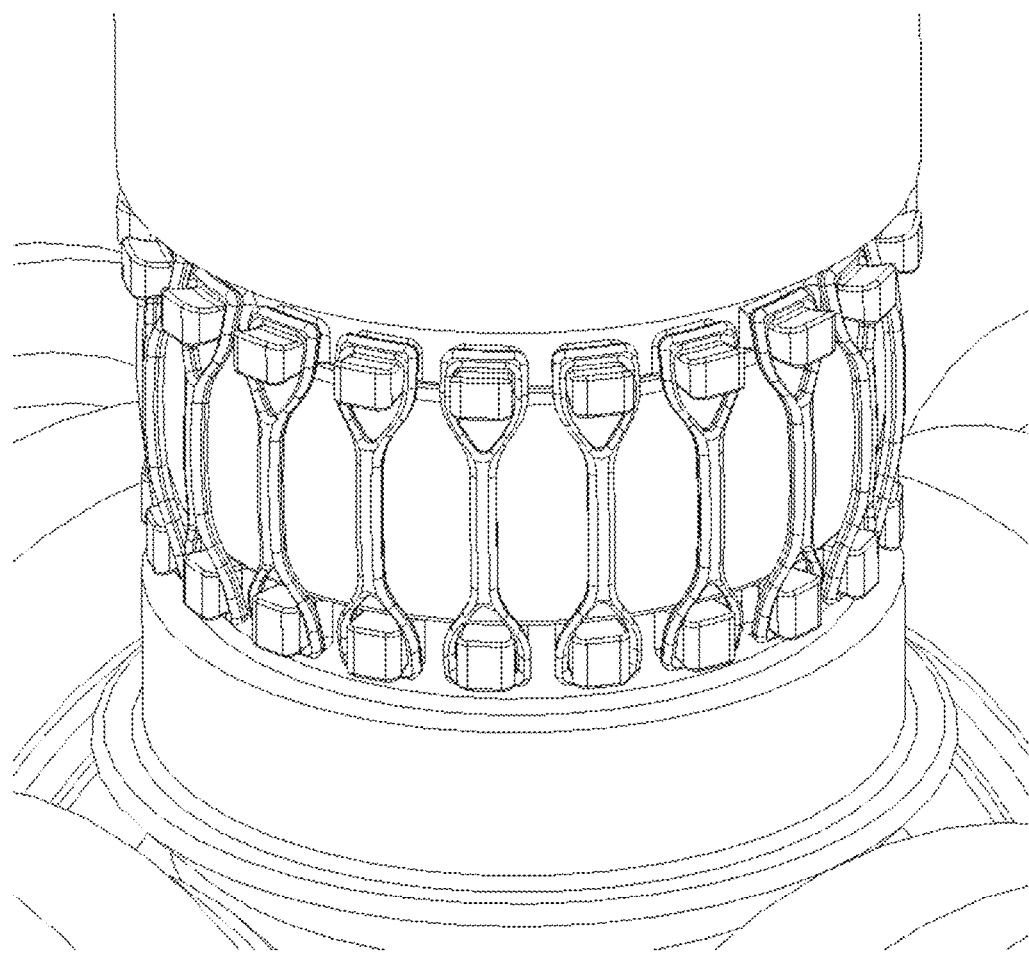
FIGS. 6A and 6B show possible examples of an assembly according to the disclosure.
Figure 6B:
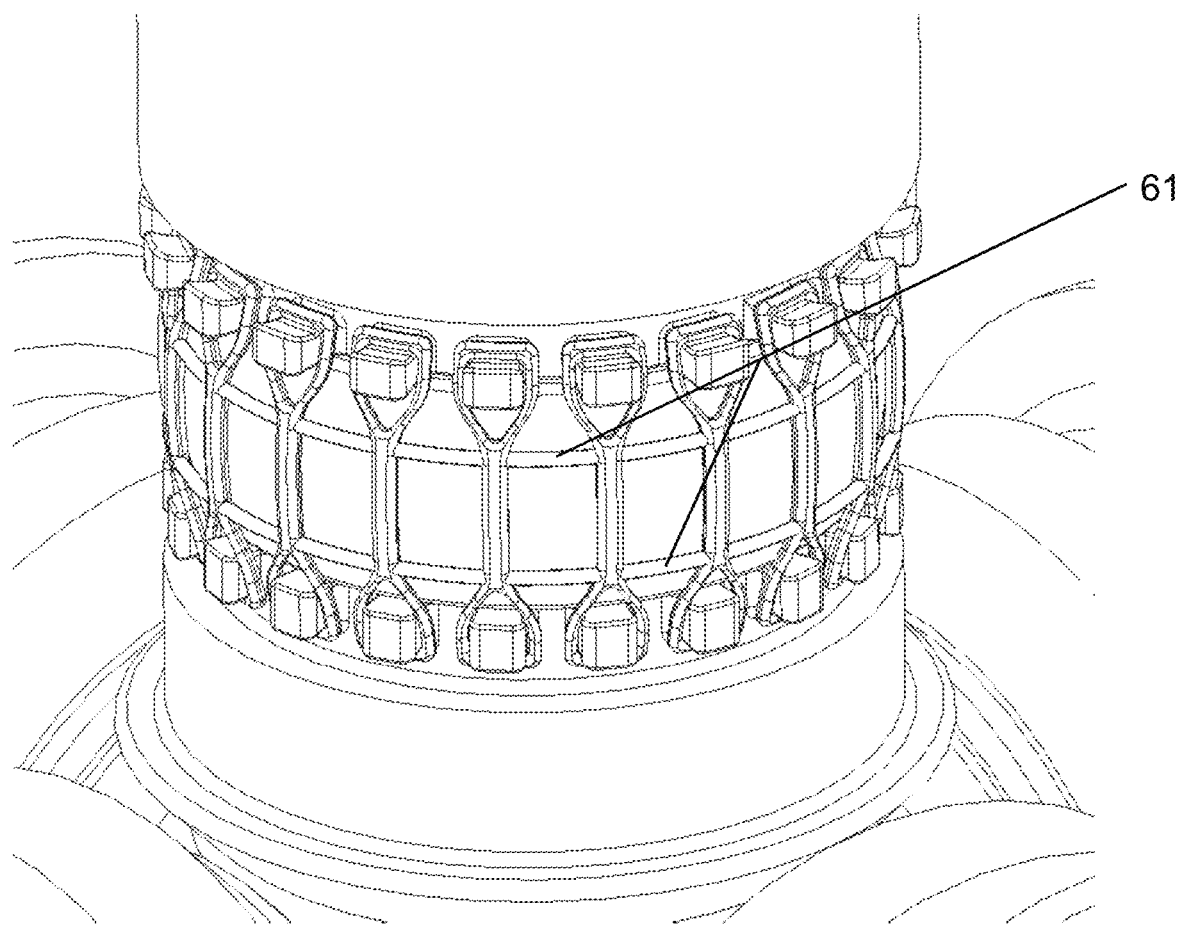

As mentioned above, various types and design of fasteners may be used. In the examples shown, a number of individual fasteners 6 are located around the assembly, as seen in FIG. 6A. Assembly of each individual fastener can be time and labour intensive, but such simple parts are simple and inexpensive to bulk manufacture. Alternatively, to improved assembly processes, the fasteners can be provided as a single part in the form of a cage or mesh or belt design combining the fasteners such that they can be fitted around the disk as a single part. An example is shown in FIG. 6B where a 'belt' of fasteners 60 is provided in which the individual fasteners are joined by one or more strings 61. The fasteners can be manufactured by fused deposition modelling (FDM) additive manufacturing or other forms of 3D printing which can reduced the overall cost and manufacturing time of the assembly A particular advantage of the disk and tensioner assembly of this disclosure is its simplicity and, particularly simplicity of manufacture. It is also impossible to assemble incorrectly. The fasteners can ensure coaxiality of the assembly and the assembly transfers torque whilst providing dielectric insulation.

The dielectric barrier and compliant joint drive have been described above in the context of a ball shaft valve assembly. This is only an example of where the dielectric barrier can provide advantages and can find application. The dielectric barrier assembly of this disclosure can, however, find application in other assemblies where torque is transmitted between a drive end and a driven end. The scope of the invention is as defined by the claims.

The invention claimed is:

1. A dielectric insulating assembly arranged to be positioned between a drive shaft and a driven shaft of a motorised drive assembly, the assembly comprising:
   a disk of dielectric insulation between the drive shaft and the driven shaft;
   a plurality of electrically non-conductive fastener elements configured to connect the drive shaft to the driven shaft and the dielectric insulation therebetween, in torque transfer engagement, the fasteners located around an outer boundary of the disk of dielectric insulation; and
   fastener elements each comprise a tie having a loop at each end, the loop at one end configured to be attached and encircle, in use, to a pin on the drive shaft and the loop at the other end configured to be attached and surround a pin on the driven shaft.

2. The assembly of claim 1, wherein the plurality of fasteners are joined into a single fastener unit to be mounted between the drive shaft and the driven shaft.

3. The assembly of claim 2, wherein the fastener unit is in the form of a belt comprising a plurality of fastener ties connected together by one or more strings.

4. The assembly of claim 1, wherein the disk is a disk of ceramic material.

5. The assembly of claim 1, wherein the fasteners are aramid fiber fasteners.

6. The assembly of claim 1, wherein the fasteners are arranged to provide a compressive force against the periphery of the dielectric disk.

7. A ball shaft assembly comprising:
   a ball shaft as a driven shaft;
   a cam shaft as a drive shaft, and
   a dielectric assembly as claimed in claim 1 fitted between the ball shaft and the cam shaft.

8. The assembly of claim 7, further comprising a motor arranged to drive the ball shaft via the cam shaft, the dielectric assembly located between and in torque transfer engagement with the ball shaft and the cam shaft.

9. The assembly of claim 7, further comprising a handle to manually rotate the ball shaft.

10. The assembly of a claim 8, wherein the motor is an electric motor.

11. A water supply system including:
    the assembly of claim 7.

12. The water supply system of claim 7, wherein the water supply is an aircraft water supply system.

* * * * *